United States Patent [19]

Elwell

[11] Patent Number: 5,024,411
[45] Date of Patent: Jun. 18, 1991

[54] BEVERAGE CONTAINER HOLDER

[75] Inventor: John R. Elwell, Dearborn, Mich.

[73] Assignee: Chrysler Corporation, Highland Park, Mich.

[21] Appl. No.: 570,254

[22] Filed: Aug. 20, 1990

[51] Int. Cl.⁵ .............................................. A47K 1/08
[52] U.S. Cl. .............................. 248/311.2; 224/42.42; 224/281
[58] Field of Search ............... 248/311.2, 309.1, 316.5; 220/85 H; 224/281, 42.42

[56] References Cited

U.S. PATENT DOCUMENTS

| 286,113 | 10/1883 | Burk . | |
|---|---|---|---|
| 2,942,830 | 6/1960 | Senay . | |
| 4,040,659 | 8/1977 | Arnold . | |
| 4,286,742 | 9/1981 | Pellegrino . | |
| 4,511,072 | 4/1985 | Owens . | |
| 4,645,157 | 2/1987 | Parker . | |
| 4,733,908 | 3/1988 | Dykstra et al. . | |
| 4,756,572 | 7/1988 | Dykstra et al. . | |
| 4,759,584 | 7/1988 | Dykstra et al. . | |
| 4,783,037 | 11/1988 | Flowerday . | |
| 4,828,211 | 5/1989 | McConnell et al. . | |
| 4,907,775 | 3/1990 | Lorence et al. | 248/311.2 |
| 4,928,865 | 5/1990 | Lorence et al. | 248/311.2 |
| 4,943,111 | 7/1990 | VanderLaan | 248/311.2 X |
| 4,955,571 | 9/1990 | Lorence et al. | 248/311.2 |

Primary Examiner—Ramon O. Ramirez
Attorney, Agent, or Firm—Edward A. Craig

[57] ABSTRACT

A beverage container holder which is storable and attachable for extending from the front of the center console. The beverage container has a pair of arcuate adjustable pivotal engaging arms with ramp surfaces for guiding a beverage container into the holder. The arms are adjustable for securely engaging the sides of different size beverage containers. The cup holder has a U-shaped flange portion for wrapping around a front lip of the console storage compartment. A "catch" portion is provided for securing of the storage compartment cover latch mechanism to the cup holder, thereby securing the cover and cup holder in place.

12 Claims, 3 Drawing Sheets

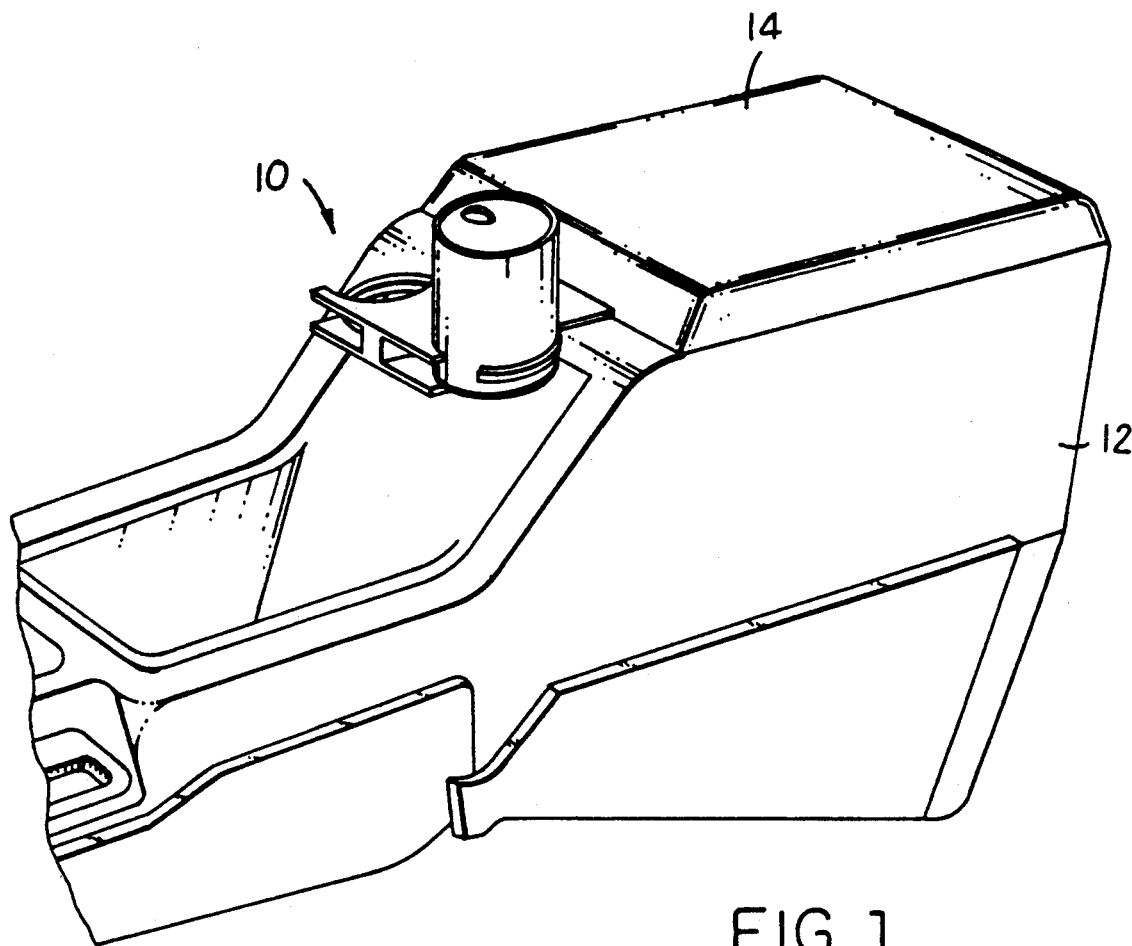
FIG. 1
FIG. 2
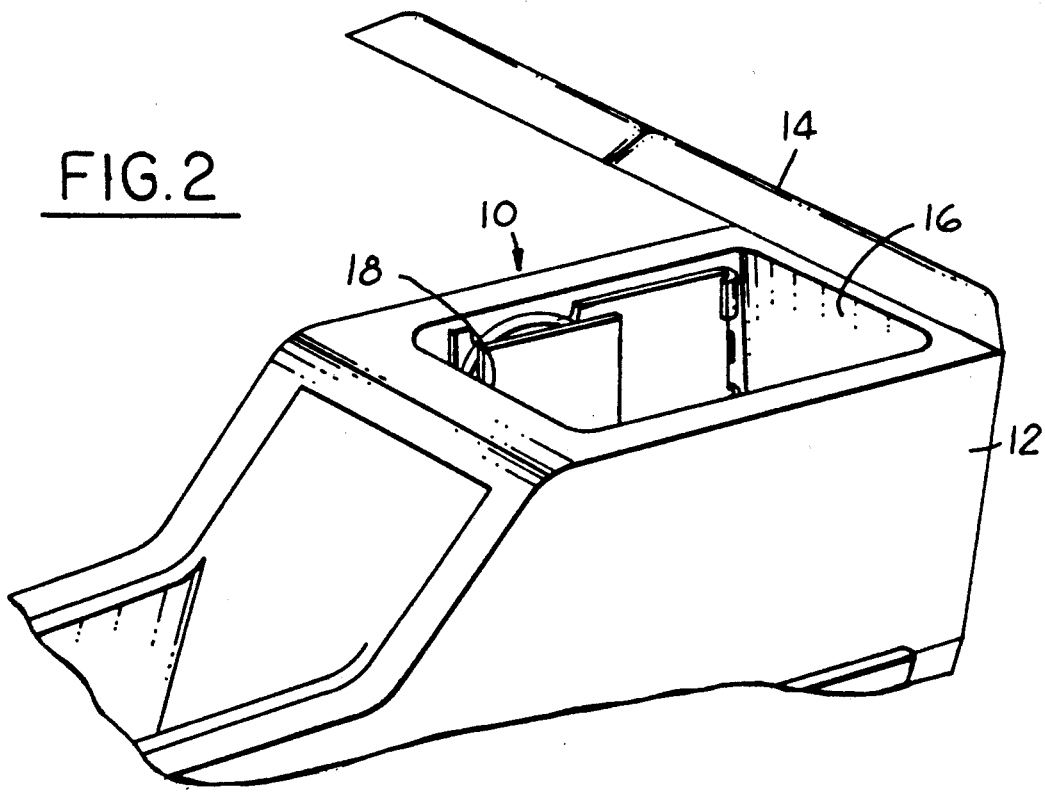

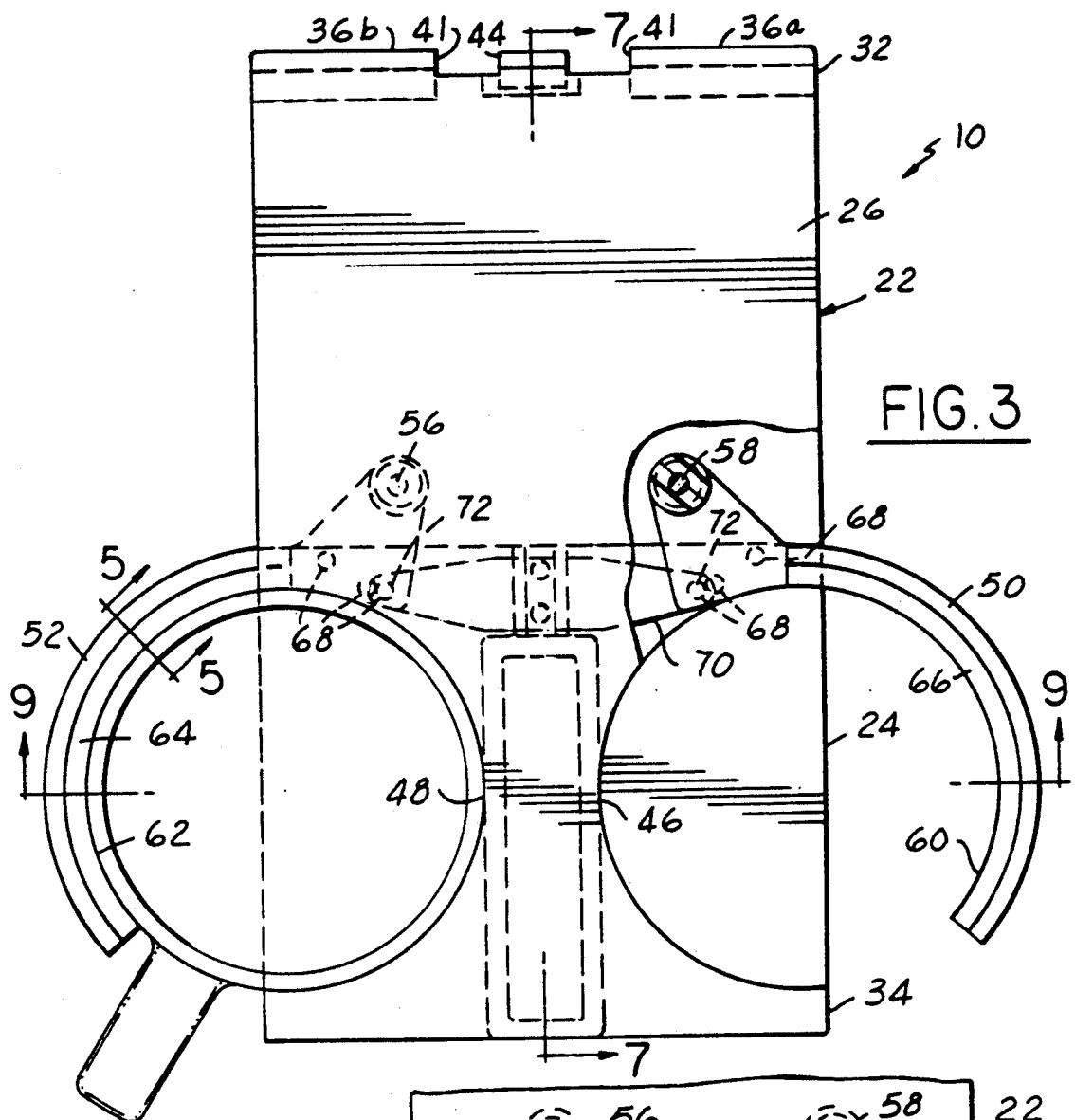
FIG.3
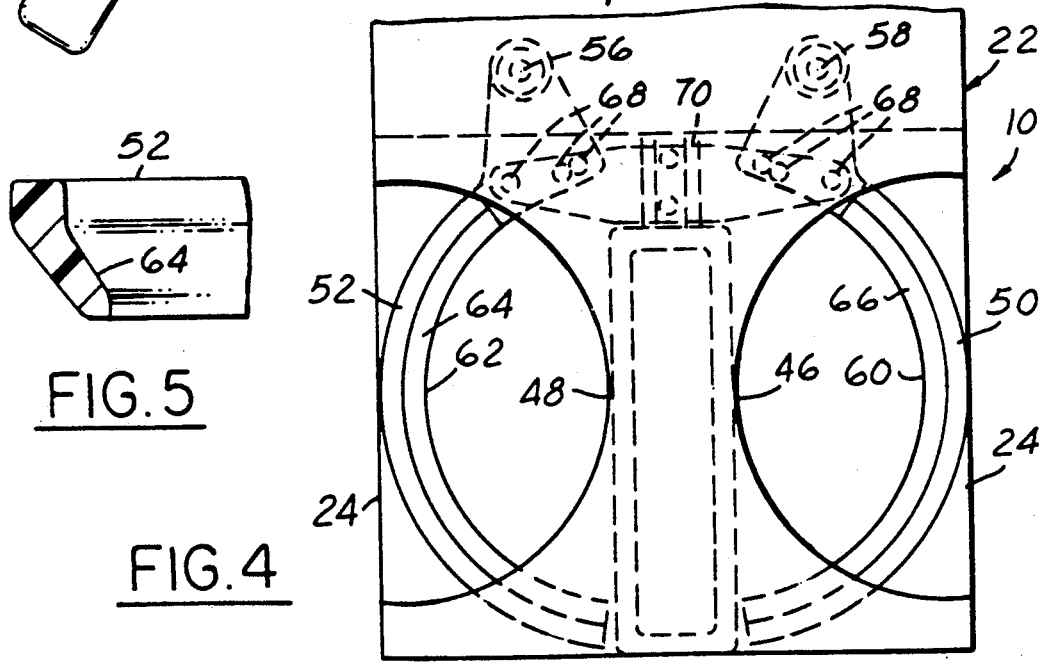
FIG.5
FIG.4

BEVERAGE CONTAINER HOLDER

BACKGROUND OF THE INVENTION

1. Technical Field

The present invention relates generally to a vehicle beverage container holder. More particularly, the present invention relates to a vehicle container holder which may be easily and conveniently placed in a vehicle and stored when it is not in use.

2. Description of Related Art

In the past, it has been desirable to provide a construction for beverage container holders which are readily usable by passengers of a vehicle. Several constructions have been provided including those using the door to the glove box or utilizing various storage compartments for providing a suitable beverage holding container in the interior of the vehicle.

In the past, it has also been desirable to provide a beverage container holder which can conserve space but allows holding of two beverage containers at a time, since it is often necessary to provide holding of two containers at the same time when traveling in a vehicle. In addition, it has been desirable to provide a beverage container holder which can be utilized only when necessary and can be conveniently stored in an out of the way location when not in use.

Examples of various beverage container holders for vehicles are shown in U.S. Pat. Nos. 4,828,211 to McConnell; 4,783,037 to Flowerday; 4,759,584 to Dextra et al.; 4,756,572 to Dextra et al.; 4,733,908 to Dextra et al.; 4,645,157 to Parker; 4,511,072 to Owens; 4,286,742 to Pellelgrino; and 4,040,659 to Arnold.

While these cup holder constructions have been improvements in the art, there remains a need in the art for an improved dual cup holder device which is convenient and can be stored in an out of the way location.

SUMMARY OF THE INVENTION

In accordance with the present invention, there is provided a dual beverage container holder assembly which includes a lower beverage container support portion and an upper elongated member vertically spaced from one another. The lower support portion and upper elongated member are connected at the longitudinal center with an upstanding web member. The upper elongated member includes a first connection end and a second container holding end. The first connection end has a U-shaped flange portion which extends downwardly from the first connection end such that the opening of the U-shaped flange faces the container holder end. The U-shaped flange engages a transversely extending lip of the front lip of a storage compartment in the center console of a vehicle for supporting the beverage container holder in a usable position. The second container holding end includes a pair of upward facing arcuate surfaces for forming concavities in said second container holding end for supporting a portion of the sides of a pair of beverage containers. A pair of pivotal arms are provided, one being pivotally connected on each side of the web portion. Each arm includes an arcuate end portion for engaging a side of the beverage container opposite to the pair of opposed arcuate surfaces. The arcuate end portions include a slanted lip portion which extends downwardly and inwardly to a container engaging edge. The lip portion provides guidance for placement of a container between one of each of said arcuate end portions and said arcuate surfaces of said elongated member. The pivotal arms include a plurality of detents therein. A spring means is provided which is attached to the web portion. The spring means engages the detents and arcuate ends of the pivotal arms for holding the arms at various spaced locations from the arcuate surfaces of the upper elongated member.

Other features and advantages of the present invention will be readily appreciated as same becomes better understood in light of the following description taken in connection with the accompanying drawings.

BRIEF DESCRIPTION OF THE DRAWINGS

FIG. 1 is a perspective view of a console for a vehicle with the beverage container holder of the present invention in place therein;

FIG. 2 is a perspective view of the console on FIG. 1 with the cup holder of the present invention held in the storage position;

FIG. 3 is a top view of the beverage container holder of the present invention, with portions thereof broken away;

FIG. 4 is a top view partially broken away showing the beverage container holder of FIG. 3 in the storage position;

FIG. 5 is a sectional view taken along line 5—5 of FIG. 3;

DETAILED DESCRIPTION OF THE PREFERRED EMBODIMENT

Referring now to the figures and specifically to FIGS. 1 and 2, according to the present invention there is provided a beverage container holder 10 which is adapted for use in the center console of the vehicle 12. The center console of the vehicle 12 includes a console lid 14 hingedly attached to the center console for access to a storage compartment 16. The beverage container holder 10 may be advantageously stored on a side wall forming the storage compartment by way of suitable attachments or the like, such as for example a hook and loop fastener system such as Velcro ®.

Figure 6:
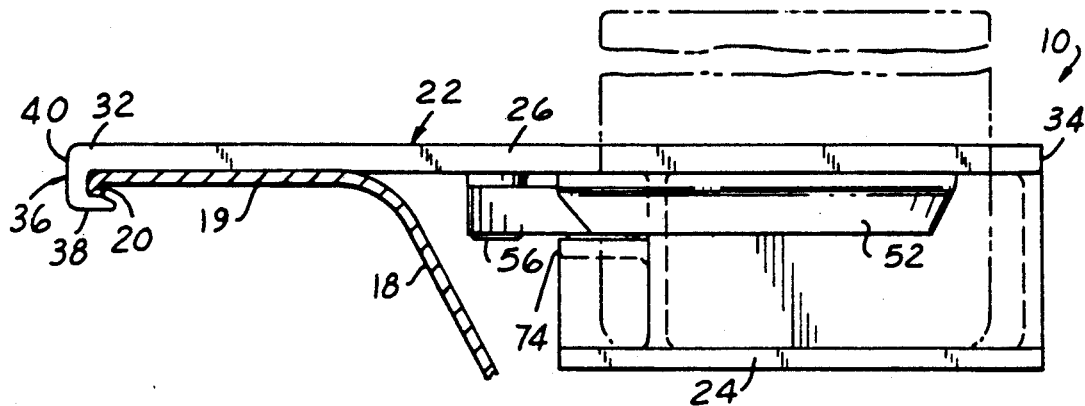
FIG. 6 is a side view of the beverage container holder of the present invention.

The walls defining the storage compartment include a front wall 18, as seen in more detail in FIG. 6. The front wall 18 includes a horizontally extending wall 19 which terminates in a transversely extending lip portion 20.

Figure 7:
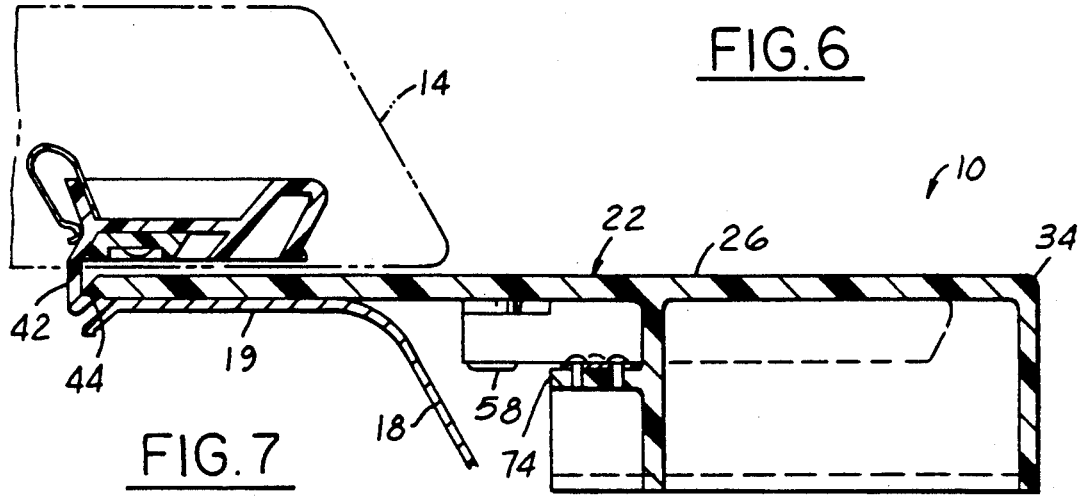
FIG. 7 is a sectional view taken along line 7—7 of FIG. 3.
Figure 8:
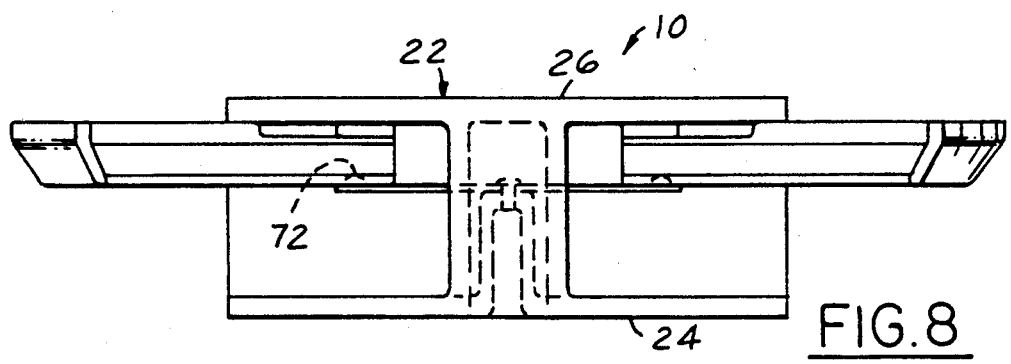
FIG. 8 is a front view of the beverage container holder of the present invention.
Figure 9:
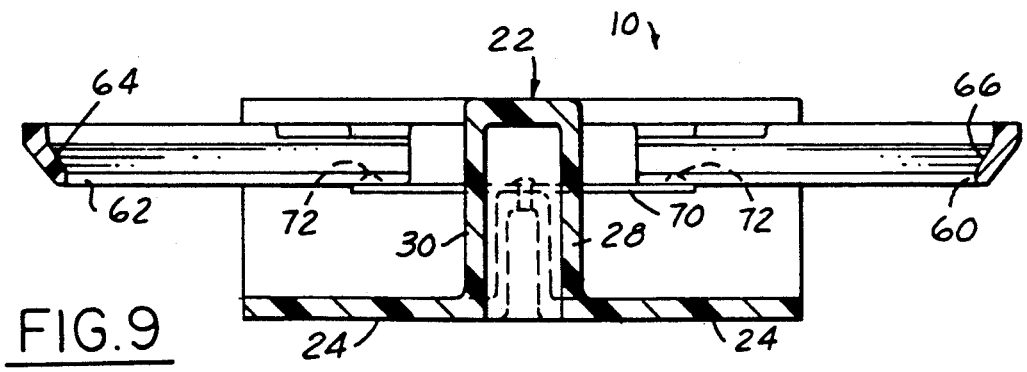
FIG. 9 is a sectional view taken along line 9—9 of FIG. 3.

Referring now to FIGS. 6–9, the beverage container holder assembly 10 includes a base portion generally indicated at 22. The base portion includes a lower beverage container support portion 24 and an upper elongate member 26 which are vertically spaced from one another, as best seen in FIG. 6. Referring to FIGS. 8 and 9, the upper elongate member and the lower beverage container support portion 24 are connected about their centers by a web member, which preferably comprises a pair of walls 28 and 30.

Referring to FIGS. 6–8, the upper elongate member 26 includes a first connection end 32 and a second container holding end 34. The connection end 32 includes a U-shaped flange portion 36 for engaging the lip 20 of the front wall 18 of the console. The U-shaped flange portion 36 includes a horizontal lip extension 38 and also includes a vertical connecting section 40 for connecting the horizontal portion 38 with the elongate member 26 at end 32 as best seen in FIG. 6. Referring to FIGS. 3 and 7, at the longitudinal central portion of the end 32 there is provided an opening 41 which divides the U-shaped flange portion 36 into the two separate portions 36a and 36b for allowing the latch mechanism 42 of the hinged cover 14 to engage a catch portion 44 of the elongate member 22. Thus, in operation, the U-chaped flange portion engages the transversely extending flange 20 at portions 36a and 36b for securing the cup holder assembly to the console at lip portion 20 in conjunction with abutting the horizontal wall 19. The cup holder 10 and console cover 14 is locked in this position by engagement of the latch 42 with catch portion 44. The latch 42 and/or a vertical wall in the hinged cover prevent movement of the cup holder 10 which would release the U-shaped flanges 36a and 36b.

Referring now to FIGS. 3 and 4, the second container holding end includes a pair of arcuate surfaces 46 and 48 which face in an outward direction. The arucate surfaces 46 and 48 are adapted to engage the sides of a beverage container when held in the beverage container holder 10. The lower beverage container support portion 24 underlies the arcuate surfaces 46 and 48 for supporting a beverage container in a vertical direction. A pair of pivotal arms 50 and 52 are pivotally attached to the upper elongate member 26 by means of bolts 56 and 58. The pivotal arms include arcuate surfaces 60 and 62 for engaging the side of the beverage container opposite the arcuate portions 46 or 48. Referring now also to FIG. 5, each arcuate arm includes a ramped surface 64 and 66, respectively. The ramp surfaces form a funnel-like structure whereby the beverage container can be guided between the surface 46 and the arm 50, for instance.

Detents 68 are provided on the under side of the arms 50 and 52 adjacent the pivot points 56 and 58. A spring member 70 is provided which includes an upward protrusion 72, as best seen in FIGS. 8 and 9, which cooperate with the detent portions 68, to provide various open and stored positions to the pivotal arms 50 and 52. The spring member is supported on a rear web portion 74 which is connected to the base 24.

Referring again to FIG. 4, the cup holder is shown in the storage position. In the storage position the arms are pivoted such that the end positions abut the walls 28 and 30. In this position the arms 50 and 52 do not extend outward from the outer edge of the support portion 24. As can be seen from FIG. 4, the protrusion 72 engages the outermost detent portion in each arm in the storage position. The remaining two detents provide for two present locations for the arms 50 or 52 in order to hold either a narrow beverage can or a wider cup (as shown).

In a preferred embodiment, the cup holder of the present invention is preferably injection molded as a one-piece assembly with the exception that the arms 50 and 52 and spring 70 are attached after molding. In a preferred embodiment, the arms are also injection molded components which are later attached to the cup holder.

The invention has been described in a illustrative manner and it is to be understood that the terminology which has been used is intended to be descriptive rather than limitative. Obviously, many modifications and variations of the invention are possible in light of the above teachings. Therefore, it is to be understood that within the scope of the appended claims the invention may be practiced otherwise than as specifically described.

What is claimed is:

1. A beverage container holder adopted for use in:
   a center console of a vehicle, said center console including: walls defining a storage compartment, said walls defining said storage compartment including a front wall, said front wall including a transversely extending lip portion extending into said storage compartment; and a hinged cover for covering of the top of said storage compartment; said beverage container holder assembly comprising:
   a lower beverage container support portion and an upper elongate member vertically spaced from one another and connected at the center with an upstanding web member, said upper elongate member including a first connection end and a second container holding end, said first connection end including a means for removably engaging the transversely extending lip thereby supporting said beverage container holder in a useable position;
   said second container holding end including a pair of outboard facing arcuate surfaces for forming concavities in said second container holding end for supporting a portion of the sides of a pair of beverage container;
   a pair of pivotal arms pivotally connected to said upper elongate member; said pair of arms each including an arcuate end portion for engaging a side of a beverage container opposite said pair of opposed arcuate surfaces; and
   a means operable between said web portion and said pivotal arms for holding the arms at various spaced locations from said arcuate surfaces of said upper elongate member.

2. The beverage container of claim 1 wherein said means for removably engaging the transversely extending lip further comprises a U-shaped flange portion wherein the opening of the U-shaped flange faces the container holding edge, said "U" shaped flange being adapted for engaging said transversely extending lip.

3. The beverage container of claim 1 wherein said arcuate end portions each further include a slanted ramp portion extending downwardly and inwardly to a container engaging edge, said ramp portion providing guidance for placement of a container between one of each of said arcuate end portions and said arcuate surfaces of said upper elongate member.

4. The beverage container of claim 1 wherein said means operable between said web portion and said pivoted arm further comprises said pivotal arms including a plurality of detents therein and a spring member is attached to said web portion, said spring member having a portion thereof for removably engaging the detents.

5. The beverage container of claim 2 wherein said U-shaped flange is divided into a pair of spaced flange portions and a catch portion extends from said elongate member between said spaced flange portions and said hinge cover further includes a latching mechanism for engaging said catch portion to secure said hinged cover and said beverage container holder to said console.

6. The combination of claim 5 further comprising a means for removably storing said beverage container holder in said storage compartment.

7. The combination of claim 6 wherein said means is a hook and loop type fastener for removably affixing said beverage container holder assembly to an inner wall of said storage compartment.

8. A center console and beverage container holder combination comprising:
- a center console for a vehicle, said center console including: walls defining a storage compartment, said walls defining said storage compartment including a front wall, said front wall including a transversely extending lip portion extending into said storage compartment; and a hinged cover for covering of the top of said storage compartment;
- a removable beverage container holder assembly comprising:
- a lower beverage container support portion and an upper elongate member vertically spaced from one another and connected at the center with an upstanding web member, said upper elongate member including a first connection end and a second container holding end, said first connection end including a U-shaped flange portion extending downwardly from said first connection end, wherein the opening of said U-shaped flange faces said container holder end, said U-shaped flange being for engaging said transversely extending lip of said front wall for supporting said beverage container holder in a useable position;
- said second container holding end including a pair of outboard facing arcuate surfaces for forming concavities in said second container holding end for supporting a portion of the sides of a pair of beverage container;
- a pair of pivotal arms pivotally connected to said upper elongate member; said pair of arms each including an arcuate end portion for engaging a side of a beverage container opposite said pair of opposed arcuate surfaces, said arcuate end portions including a slanted ramp portion extending downwardly and inwardly to a container engaging edge, said ramp portion providing guidance for placement of a container between one of each of said arcuate end portion and said arcuate surface of said elongate member, said pivotal arms including a plurality of detents therein; and
- a spring means attached to said web portion, said spring means for engaging the detents in said arcuate ends of said pivotal arms for holding the arms at various spaced locations from said arucate surfaces of said upper elongate member.

9. The combination of claim 8 wherein said U-shaped flange is divided into a pair of spaced flange portions and a catch portion extends from said elongate member between said spaced flange portions and said hinge cover further includes a latching mechanism for engaging said catch portion to secure said hinged cover and said beverage container holder to said console.

10. The combination of claim 9 further comprising a means for removably storing said beverage container holder in said storage compartment.

11. The combination of claim 10 wherein said means is a hook and loop type fastener for removably affixing said beverage container holder assembly to an inner wall of said storage compartment.

12. A center console beverage container holder combination comprising:
- a center console for a vehicle, said center console including walls defining a storage compartment, said walls including a front wall having a substantially horizontal wall portion with a downwardly extending lip portion and a hinged cover for covering the top of said storage compartment, said cover including a latching mechanism at a central portion thereof;
- a removable beverage container holder assembly comprising:
- an upper elongate member having a container holder end and a connection end;
- a lower beverage container portion vertically spaced from said upper elongate member at said cup holding end and connected at about the longitudinal center of said elongate member by a pair of web members;
- a pair of laterally spaced U-shaped flange portions extending underneath said upper elongate member at said connection end for forming a channel opening toward said container holder end for engaging said downwardly extending lip portion, wherein said upper elongate member overlies said horizontal walls for holding said beverage container holder assembly on said console;
- a catch portion extending from said upper elongate member between said pair of laterally spaced flange portions, said catch portion for cooperating with said latching mechanism of said cover portion for securement of said beverage container holder assembly in said console;
- said container holding end including a pair of outboard facing arcuate surfaces for forming a concavities in said second container holding end for supporting a portion of the sides of a pair of beverage containers;
- a pair of pivotal arms pivotally connected to said upper elongate member; said pair of arms each including an arcuate end portion for engaging a side of a beverage container opposite said pair of outboard facing arcuate surfaces, said arcuate end portions including a slanted ramp portion extending downwardly and inwardly to a container engaging edge, said ramp portion providing guidance for placement of a container between one of each of said arcuate end portion and said arcuate surface of said elongate member, said pivotal arms including a plurality of detents therein; and
- a spring means attached to said web members, said spring means for engaging the detents in said arcuate ends of said pivotal arms for holding the arms at various spaced locations from said arcuate surfaces of said upper elongate member; and
- a means for removably storing said beverage container holder in said storage compartment.

* * * * *